United States Patent
Buxbaum et al.

(10) Patent No.: US 6,803,336 B1
(45) Date of Patent: Oct. 12, 2004

(54) FIRE-RESISTANT SUBSTANCE AND METHOD FOR PRODUCING A FIRE-RESISTANT LINING

(75) Inventors: Franz Buxbaum, Bad Vöslau (AT); Wilfried Eckstein, Trofaiach (AT)

(73) Assignee: Refractory Intellectual Property GmbH & Co. KG (AT)

( * ) Notice: Subject to any disclaimer, the term of this patent is extended or adjusted under 35 U.S.C. 154(b) by 12 days.

(21) Appl. No.: 10/344,436

(22) PCT Filed: Oct. 17, 2001

(86) PCT No.: PCT/EP01/12016

§ 371 (c)(1),
(2), (4) Date: Feb. 10, 2003

(87) PCT Pub. No.: WO02/34693

PCT Pub. Date: May 2, 2002

(30) Foreign Application Priority Data

Oct. 21, 2000 (DE) .......................... 100 52 352

(51) Int. Cl.[7] .......................... C04B 35/04; B22D 41/02
(52) U.S. Cl. ...................... 501/108; 501/109; 501/110; 266/280
(58) Field of Search ................................ 501/108, 109, 501/110, 101; 266/280–286

(56) References Cited

U.S. PATENT DOCUMENTS

| | | | |
|---|---|---|---|
| 3,222,196 A | | 12/1965 | Ben et al. |
| 4,049,461 A | | 9/1977 | Mortl et al. |
| 4,130,438 A | * | 12/1978 | Watanabe et al. ........... 501/101 |
| 4,799,652 A | | 1/1989 | Daussan et al. |
| 4,829,538 A | | 5/1989 | Hlawatschek et al. |
| 5,741,349 A | * | 4/1998 | Hubble et al. ................ 75/500 |
| 6,464,932 B1 | * | 10/2002 | Nomura et al. ............. 266/275 |

FOREIGN PATENT DOCUMENTS

| | | |
|---|---|---|
| BR | 9600172 A | 10/1997 |
| DE | 903437 | 2/1954 |
| DE | 3028761 C2 | 9/1982 |
| DE | 4336269 A1 | 4/1995 |
| EP | 0214882 B2 | 2/1989 |
| GB | 956270 A | 4/1964 |
| GB | 995565 A | 6/1965 |

* cited by examiner

*Primary Examiner*—Karl Group
(74) *Attorney, Agent, or Firm*—Christopher L. Parmelee; Walker & Jocke LPA

(57) ABSTRACT

The invention relates to a fire resistant substance and to a method for producing a fire-resistant lining. The fire-resistant substance contains MgO sinter and up to 5 wt. % of a reducing agent selected from the group consisting of substances that contain carbon. The lining has several layers with decreasing quantities of reducing agents.

7 Claims, No Drawings

FIRE-RESISTANT SUBSTANCE AND METHOD FOR PRODUCING A FIRE-RESISTANT LINING

The present invention relates to a method of producing a refractory lining.

Hearths of electric furnaces are frequently lined using dry hearth masses. In addition to masses based on sintered dolomite, masses based on MgO sinter are predominantly used.

In the related art, the grain size distribution is considered of essential significance in the processing of the mass and its compressibility.

Upon the (oxidative) start up of an furnace which was produced using a new mass, ceramic binding of the mass rapidly occurs. The lining is therefore as resistant as possible as soon as, for example, scrap is loaded.

European Patent 0 214 882 B1 describes a fireproof furnace lining, which is constructed from multiple layers, the layer facing the molten metal to completely sinter during operation, while the layers lying behind it, in particular the layer facing the furnace wall, to sinter partially at most, in order to make them easier to break out after the lining wears out.

The fireproof mass comprises fireproof inorganic particles which are embedded in a binding agent. The different sintering properties of the individual layers are adjusted via the grain size of the fireproof inorganic material.

The present invention is to provide the possibility of being able to, for example, produce a furnace lining which has different sintering behavior over its thickness.

The method according to the present invention includes features of claim 1. Embodiments are described in the subclaims.

Surprisingly, it has been shown that in principle the mass must only include two components for this purpose, namely MgO sinter and a reducing agent.

The use of a binding agent is superfluous. The selection of specific grain sizes or a specific grain size distribution is of only secondary significance.

It is sufficient, as described, to produce the mass exclusively from MgO sinter and reducing agent, for example elemental carbon. In addition to MgO sinter, the fireproof matrix material may contain, if necessary, other refractory oxides, such as $Al_2O_3$, $TiO_2$, $Fe_2O_3$, CaO or the like; fired dolomite may also be used.

The sintering behavior of the (hearth) mass may be adjusted in a targeted way via the mass proportion of the reducing agent within the (hearth) mass. Through the addition of carbon (for example as graphite, carbon black, or petroleum coke) a reduction of the dicalcium ferrite in the MgO sinter occurs and CaO and FeO arise. FeO diffuses into the periclase (MgO sinter) and forms magnesiowustite.

By increasing the added carbon, the sintering behavior may be reduced continuously.

Adding pure metals such as Si or Al also encourages the reduction processes described, in that oxygen is consumed and the sintering of the mass is delayed. Other reducing agent, particularly other C carriers, such as resins (for example, phenol resin), pitch, or sugar, are at least partially possible.

In principle, those additives are usable which act as reducing agents, if they and/or the reaction products resulting therefrom do not lead to effects which oppose the object of the invention. Such disadvantageous effects would be the encouragement of the sintering of the mass or the reduction of its fire resistance (refractoring) (for example, because of melt phase formation). For example, sodium sulfite as a reducing agent would lead to undesirable sodium oxide as a decomposition product.

The following table shows the cold compressive strengths after a reducing firing at 1,600° C. in $N/mm^2$ for hearth masses of the type described above made of MgO sinter (grain size: up to 8 mm) and different carbon contents, in the form of graphite, after an oxidizing pre-firing at 1,300° C.

| Carbon content | Cold compressive strength |
| --- | --- |
| 0% | 46.6 |
| 1% | 44.1 |
| 2% | 42.4 |
| 3% | 35.8 |
| 4% | 27.9 |
| 5% | 20.9 |

In contrast to the teaching of European Patent 0 214 882 B1, the addition of a binding agent was intentionally dispensed with. The effects described arise independently of the grain size selected for the MgO sinter. This may even be <5 mm. In other words, starting from one and the same base mass (MgO sinter), hearth masses having different sintering behavior may be produced exclusively by selecting and setting the quantity of the reducing agent added.

In this way, a fireproof lining may be produced in multiple layers, subsequent masses of the type described above being used, however, each having a reduced proportion of reducing agent. While the first layer, for example, comprises a mass having 5 weight-percent carbon, the carbon content of the layer subsequently applied to this first layer and/or following layers is reduced to, for example, 0.5% in the last layer applied, which neighbors the molten metal in application.

While the carbon of this last applied layer having the lowest carbon content burns out a few centimeters deep as the furnace is put into operation (on the fire side), so that in this layer almost complete sintering is achieved, as in typical hearth masses, the degree of sintering of the layers lying behind it is reduced more and more (with increasing carbon content), so that, for example, the external layer, which neighbors the metal casing of the furnace, remains brittle even after a long period of use and is only slightly sintered, which significantly favors breaking out the lining in case of repair or replacement.

Different types of MgO sinter may be used. Due to the chemism described, MgO sinters having higher iron contents (chemical analysis), which until now could only be used in a limited way, are particularly suitable.

According to one embodiment, MgO sinter having a $Fe_2O_3$ content>1.5 or >3 weight-percent is suggested, and according to a further embodiment, MgO sinter having a $Fe_2O_3$ content>5 weight-percent is suggested.

Expressed as a mineral paragenesis, this corresponds to a.$C_2F$ content of approximately 2 or 4 weight-percent and/or 7 weight-percent.

The carbon may be added as graphite, carbon black, or the like. In any case, a homogeneous mixture with the sintered grain is desirable. The grain size of the carbon may be <200 μm, and according to one embodiment <100 μm.

What is claimed is:

1. A method of producing a refractory lining of a metallurgical melting vessel in multiple superimposed layers, wherein refractor masses, which have MgO sinter and up to 5 weight-percent of at least one reducing agent selected from the group consisting of metals and carbonaceous substances, being applied sequentially, with a reduced content of reducing agent in each layer.

2. The method according to claim 1, wherein elemental carbon is used as the reducing agent.

3. The method according to claim 1, wherein the reducing agent is selected from the group consisting of resins, pitch and tar.

4. The method according to claim 1, wherein the refractory mass comprises exclusively MgO sinter and reducing agent.

5. The method according to claim 1, wherein the refractory mass comprises MgO sinter which has a $Fe_2O_3$ content>1.5 weight-percent.

6. The method according to claim 1, wherein the refractory mass comprises MgO sinter which has a $Fe_2O_3$ content of >3 weight-percent.

7. The method according to claim 1, wherein the refractory mass comprises MgO sinter which has a $Fe_2O_3$ content of >5 weight-percent.

* * * * *